US010960649B2

(12) United States Patent
Farkas

(10) Patent No.: US 10,960,649 B2
(45) Date of Patent: Mar. 30, 2021

(54) FLEX-CRACK RESISTANT AND THERMALLY RESISTANT ASEPTIC BULK BAGS FOR FLEXIBLE PACKAGING

(71) Applicant: Liqui-Box Corporation, Richmond, VA (US)

(72) Inventor: Nicholas Farkas, Glenburnie (CA)

(73) Assignee: LIQUI-BOX CORPORATION, Richmond, VA (US)

(*) Notice: Subject to any disclaimer, the term of this patent is extended or adjusted under 35 U.S.C. 154(b) by 153 days.

(21) Appl. No.: 16/188,485

(22) Filed: Nov. 13, 2018

(65) Prior Publication Data
US 2019/0143652 A1 May 16, 2019

Related U.S. Application Data

(60) Provisional application No. 62/585,673, filed on Nov. 14, 2017.

(51) Int. Cl.
*B32B 27/08* (2006.01)
*B32B 1/00* (2006.01)
(Continued)

(52) U.S. Cl.
CPC ............... *B32B 27/08* (2013.01); *B32B 1/00* (2013.01); *B32B 27/325* (2013.01); *B65D 65/40* (2013.01);
(Continued)

(58) Field of Classification Search
CPC ......... B32B 27/08; B32B 1/00; B32B 27/325; B32B 2439/40; B32B 2250/242;
(Continued)

(56) References Cited

U.S. PATENT DOCUMENTS 3,645,992 A 2/1972 Elston et al.
4,076,698 A 2/1978 Anderson et al.
(Continued)

FOREIGN PATENT DOCUMENTS

CA 2182524 C 8/1995
CA 2231449 A1 4/1997
(Continued)

OTHER PUBLICATIONS

Cady, The Role of Comonomer Type and Distribution in LLDPE Product Performance, SPE Regional Technical Conference, Oct. 1-2, 1985, 107-119.
(Continued)

*Primary Examiner* — Michael C Miggins
(74) *Attorney, Agent, or Firm* — McAndrews, Held & Malloy, Ltd.

(57) ABSTRACT

This invention relates to inner-plies for bulk-bags that surprisingly offer not only high thermal resistance, but also high flex-crack resistance. This invention also relates to such bulk-bags made for packaging of flowable materials, aseptic or otherwise, and the process for improving their flex-crack and thermal resistance. Preferably, the packaging is aseptic. More specifically, the inner-ply of the invention comprises a resin blend comprising the Exceed® XP resin; an LDPE resin or an ethylene-α-olefin copolymer (EAO copolymer); or a blend of said LDPE resin and said EAO copolymer, with flex-crack resistance improved in both machine direction and transverse direction, in conjunction with an improved thermal resistance. Thus, in addition to possessing good flex-crack resistance, the bulk-bags can withstand steam sterilization and/or aseptic packaging conditions.

24 Claims, 8 Drawing Sheets

(51) Int. Cl.
  *B32B 27/32* (2006.01)
  *B65D 88/16* (2006.01)
  *B65D 90/02* (2019.01)
  *B65D 65/40* (2006.01)
  *B65D 75/26* (2006.01)

(52) U.S. Cl.
  CPC ............. *B65D 75/26* (2013.01); *B65D 88/16* (2013.01); *B65D 88/1606* (2013.01); *B65D 90/022* (2013.01); *B32B 2250/242* (2013.01); *B32B 2307/306* (2013.01); *B32B 2307/546* (2013.01); *B32B 2439/46* (2013.01)

(58) Field of Classification Search
  CPC ........ B32B 2307/306; B32B 2307/546; B65D 88/16; B65D 90/022; B65D 65/40; B65D 88/1606; B65D 75/28
  See application file for complete search history.

(56) References Cited

U.S. PATENT DOCUMENTS

| | | | |
|---|---|---|---|
| 4,503,102 A | 3/1985 | Mollison | |
| 4,521,437 A | 6/1985 | Storms | |
| 4,798,081 A | 1/1989 | Hazlitt et al. | |
| 4,937,299 A | 6/1990 | Ewen et al. | |
| 5,206,075 A | 4/1993 | Hodgson, Jr. | |
| 5,288,531 A | 2/1994 | Falla et al. | |
| 5,364,486 A | 11/1994 | Falla et al. | |
| 5,508,051 A | 4/1996 | Falla et al. | |
| 5,721,025 A | 2/1998 | Falla et al. | |
| 5,879,768 A | 3/1999 | Falla et al. | |
| 5,911,665 A | 6/1999 | Heydarpour et al. | |
| 5,942,579 A | 8/1999 | Falla et al. | |
| 5,972,443 A | 10/1999 | Breck et al. | |
| 6,117,465 A | 9/2000 | Falla | |
| 6,256,966 B1 | 7/2001 | Braun et al. | |
| 6,406,765 B1 | 6/2002 | Braun et al. | |
| 6,416,833 B1 | 7/2002 | Climenhage et al. | |
| 6,767,599 B2 | 7/2004 | Braun et al. | |
| 8,211,533 B2 | 7/2012 | Breck et al. | |
| 8,252,397 B2 | 8/2012 | Breck | |
| 8,563,102 B2 | 10/2013 | Breck et al. | |
| 8,978,346 B2 | 3/2015 | Breck | |
| 9,283,736 B2 | 3/2016 | Breck | |
| 9,757,926 B2 | 9/2017 | Breck | |
| 2007/0269623 A1* | 11/2007 | Breck .................... B32B 15/08 428/35.5 |
| 2011/0252745 A1* | 10/2011 | Breck .................... B32B 27/08 53/451 |

FOREIGN PATENT DOCUMENTS

| | | |
|---|---|---|
| CA | 2239579 A1 | 6/1997 |
| CA | 2280910 A1 | 8/1998 |
| CA | 2113455 C | 1/2000 |
| CA | 2151589 C | 4/2001 |
| CA | 2165340 C | 10/2003 |
| CN | 106739331 | 5/2017 |
| JP | 2012139848 | 7/2012 |

OTHER PUBLICATIONS

Wild et al., "Determination of branching distributions in polyethylene and ethylene copolymers", Journal of Polymer Science, Poly. Phys. Ed., Mar. 1982, vol. 20, Issue 3, 441-455.
PCT International Search Report and Written Opinion, dated May 21, 2019, PCT/US2018/060623, 8 pages.

* cited by examiner

Fig. 1: Table 3, Sample 1

Fig. 2: Table 3, Sample 2

Fig. 3: Table 3, Sample 3

Fig. 4: Table 3, Sample 4

Fig. 5: Table 3, Sample 5

Fig. 6: Table 3, Sample 6

FLEX-CRACK RESISTANT AND THERMALLY RESISTANT ASEPTIC BULK BAGS FOR FLEXIBLE PACKAGING

CROSS-REFERENCE TO RELATED APPLICATIONS

This application claims priority to U.S. Patent Application Ser. No. 62/585,673 filed Nov. 14, 2017, the disclosure of which his hereby incorporated by reference as if set forth in its entirety herein.

FIELD OF INVENTION

This invention relates to inner-plies for bulk-bags for flexible packaging that surprisingly offer not only high thermal resistance, but also high flex-crack resistance. This invention also relates to such bulk-bags made for packaging of flowable materials, aseptic or otherwise, and the process for improving their flex-crack and thermal resistance. Preferably, the packaging is aseptic.

BACKGROUND

Generally, bulk-bags are made from laminate films and filled with flowable materials. Laminate films, generally comprising polyolefins, for packaging flowable materials, are described in U.S. Pat. Nos. 4,503,102; 4,521,437; 5,206,075; 5,364,486; 5,508,051; 5,721,025; 5,879,768; 5,942,579; 5,972,443; 6,117,4656; 6256,966; 6,406,765; 6,416,833; and 6,767,599. These patents describe polymer blends to manufacture flexible packages for packaging flowable materials, which includes food packaging. These patents are incorporated herein by reference.

Bulk-bags for packaging flowable materials can suffer from two problems: (1) poor flex-crack resistance, and (2) poor thermal resistance. Generally speaking, flex-crack resistance and thermal resistance, the two desirable properties, work against each other. Stated differently, changing the resin blend composition to increase the thermal resistance will decrease the flex-crack resistance, and vice versa.

Superior flex-crack resistance as well as thermal resistance is needed to prevent the formation of "crocodile-skin" on the bulk-bag. "Crocodile-skin" can form when superheated steam—injected into the bag during the aseptic filling process—partially sticks the polyethylene inner-ply to the outer-ply, which, for example, could be metallized-PET laminate. As the bag cools, the polyethylene and the met-PET shrink at different rates, causing wrinkling. The sticking of the outer to the inner-plies also makes the bag stiffer, increasing flex-cracking during shipping and distribution.

Flex-Crack Resistance

Flex-crack resistance is extremely important for bulk-bags used to package flowable materials, particularly liquids, and most particularly for lower viscosity liquids like water, milk, juices, concentrates, purees and the like. These liquids can slosh around considerably during handling, transportation, and distribution of filled packages, causing flexing of the inner-ply film and flex-cracking of film materials.

Liquid movement within the bulk-bag causes flex-cracking. Flex-cracking most likely occurs in the film portion that is in close proximity to the liquid line. Flex-crack pinholes result at least in loss of oxygen and moisture barrier, reducing the shelf life potential of the packaged product, and in more extreme cases, loss of the hermetic seal, rendering the product unsafe for consumption. Flex-crack resistance is measured by Gelbo Flex Testing according to ASTM F392. Generally, a film with good flex-crack resistance will develop no, or very few, pinholes when flexed for a large number of cycles in the Gelbo Flex Tester.

Thermal Resistance

Thermal resistance of films is an important factor in aseptic packaging, in particular for aseptic steam sterilization filling processes for bags. Bags made from films with low thermal resistance tend to exhibit wrinkling or so called "crocodile-skin" on the exterior of the bag after steam sterilization, resulting in poor aesthetics and bag properties. This wrinkling can often be accompanied by the inner and outer plies of a multiply bag sticking together, or even a bag made from a monolayer film sticking to itself. In a typical steam sterilization process for aseptic filling of liquid foods, the bag is first placed into a drum or bin and the fitment is then secured onto the fill head of the filling machine. Before the fitment on the bag is opened, the fitment (or spout) assembly is subjected to a steam flush ranging from 3 to 60 seconds. The fitment is then opened, and the product is pumped into the bag. At this stage, steam can enter the bag. Residual steam in the fill head keeps the temperature at about saturated steam conditions. Once the bag has been filled with product, a steam flush is employed before, or while the fitment is being closed. This post-fill steam flush can typically last from 2 to 8½ seconds. During this step, steam often enters the bag. The higher the steam temperature used in these filling operations, the greater the chance of wrinkling of the bag and hence the need for a more thermally resistant film for the bag.

Other film applications also require good thermal resistance, such as hot-fill applications. In this type of operation, the product is hot as it is pumped into the bag—typically from 77 to 96° C. The heat from the product serves to sterilize the inside of the bag and fitment. The bag, once filled, slides down along an inclined chute and is flipped so that the fitment is facing down (with hot product above it). The bag then passes through a long heating tunnel for several minutes which is maintained at roughly the same temperature as the product fill temperature to keep the contents hot and to kill mold and bacteria. The bag subsequently enters and passes through a long cooling tunnel to cool down to almost room temperature. Films used in such bags require good thermal resistance so that the films and the seals maintain their integrity while in contact with the hot product.

The present invention concomitantly addresses the above two problems, namely: lack of flex-crack resistance, and lack of thermal resistance, in a bulk-bag by using a resin blend comprising a bimodally-distributed molecular weight polymeric material that activates one molecular weight characteristic of the blend for thermal resistance and another characteristic for flex-crack resistance.

SUMMARY

More specifically, this invention relates to flex-crack resistant, and thermally resistant bulk-bags for aseptic packaging of flowable materials, wherein said bag comprises at least one inner-ply, wherein said at least one inner ply comprises a film made from a resin blend comprising:
(a) at least 60% of Exceed® XP resin; and
(b) one of the following three components:
   (i) from 0-40% of LDPE;
   (ii) from 0-40% of EAO copolymer; and
   (iii) from 0-40% of a blend of LDPE and said EAO copolymer;

wherein said resin blend's overall density is at least 0.915; and wherein said bulk-bag has flex-crack resistance such that said film develops less than 10 pinholes per 300 cm² in 8,100 cycles, in both machine direction and transverse direction, as measured according to ASTM F392 in a Gelbo Flex Test.

The bulk-bags of the present invention have excellent flex-crack resistance. In addition, the higher density of one of the resins from which the inner-ply is made, means the bulk-bag possesses thermal resistance better than the ultra-low-density polyethylene (ULDPE, 0.912 g/cm³) resin used in the some of the films available for inner plies for bulk-bags. However, the flex-crack resistance of the present inner plies and resulting bulk-bags is similar to that of the bulk-bags made from inner-plies comprising ULDPE material.

In one embodiment, this invention relates to a bulk-bag, as recited above, comprising two inner plies comprising a film made from a resin blend comprising:
(a) at least 60% of Exceed® XP resin; and
(b) one of the following three components:
    (i) from 0-40% of LDPE;
    (ii) from 0-40% of EAO copolymer; and
    (iii) from 0-40% of a blend of LDPE and said EAO copolymer;
wherein said resin blend's overall density is at least 0.915; and
wherein said bulk-bag has flex-crack resistance such that said film develops less than 10 pinholes per 300 cm² in 8,100 cycles in both machine direction and transverse direction in a Gelbo Flex Test as measured according to ASTM F392.

In another embodiment, this invention relates to a bulk-bag, as recited above, wherein said bulk-bag has flex-crack resistance such that said film develops less than 5 pinholes per 300 cm² in 8,100 cycles in both machine direction and transverse direction in a Gelbo Flex Test as measured according to ASTM F392.

In yet another embodiment this invention relates to a bulk-bag, as recited above, wherein the LDPE content is in the range of from about 5% to about 20%.

In one embodiment, this invention relates to a bulk-bag, as recited previously, wherein the LDPE content is in the range of from about 10% to about 15%. In another embodiment, this invention relates to a bulk-bag, as recited above, wherein the EAO copolymer content is up to 40%. In yet another embodiment, this invention relates to a bulk-bag, as recited above, wherein said EAO copolymer is a butene-LLDPE resin, in a density range of from about 0.818-0.922 g/cm³.

In one embodiment, this invention relates to a bulk-bag described previously, wherein the size of said bulk-bag ranges from 20 gallons to 400 gallons. In another embodiment, this invention relates to a bulk-bag, as recited above, wherein said at least one inner-ply is in the range of 20 µm to 140 µm thickness. In yet another embodiment, this invention relates to a bulk-bag, as recited previously, comprising flowable material. In another embodiment, this invention relates to a bulk-bag, as recited previously, wherein said bulk-bag is an ESL, hot-fill, or pasteurization bag.

In one embodiment, this invention relates to a bulk-bag, as recited previously, wherein the HDPE peak-melting endotherm as percentage of the total melting endotherm, in a DSC measurement, of the resin blend is in the range of from about 40 to about 60. In another embodiment, this invention also relates to a bulk-bag, as recited previously, wherein the HDPE peak-melting endotherm as percentage of the total melting endotherm, in a DSC measurement, of the resin blend is in the range of from about 50 to about 60.

In one embodiment, this invention relates to a process for making a bulk-bag, comprising:
(I) providing at least one inner-ply, wherein said at least one inner ply comprises a film made from a resin blend comprising:
    (a) at least 60% of Exceed® XP resin; and
    (b) one of the following three components:
        (i) from 0-40% of LDPE;
        (ii) from 0-40% of EAO copolymer; and
        (iii) from 0-40% of a blend of LDPE and said EAO copolymer;
    wherein said resin blend's overall density is at least 0.915; and
    wherein said bulk-bag has flex-crack resistance such that said film develops less than 10 pinholes per 300 cm² in 8,100 cycles in both machine direction and transverse direction in a Gelbo Flex Test as measured according to ASTM F392.

In another embodiment, this invention relates to a process for making a bulk-bag, as recited above, comprising:
(I) providing two inner plies comprising a film made from a resin blend comprising:
    (a) at least 60% of Exceed® XP resin; and
    (b) one of the following three components:
        (i) from 0-40% of LDPE;
        (ii) from 0-40% of EAO copolymer; and
        (iii) from 0-40% of a blend of LDPE and said EAO copolymer;
    wherein said resin blend's overall density is at least 0.915; and
    wherein said bulk-bag has flex-crack resistance such that said film develops less than 10 pinholes per 300 cm² in 8,100 cycles in both machine direction and transverse direction in a Gelbo Flex Test as measured according to ASTM F392.

In yet another embodiment, this invention relates to a process for making a bulk-bag, as recited previously, wherein the LDPE content is up to 25%. In one embodiment, this invention relates to a process for making a bulk-bag, as recited previously, wherein the LDPE content is in the range of from about 5% to about 20%. In another embodiment, this invention relates to a process for making a bulk-bag, as recited previously, wherein the LDPE content is in the range of from about 10% to about 15%. In yet another embodiment, this invention relates to a process for making a bulk-bag, as recited previously, wherein the EAO copolymer content is up to 40%. In one embodiment, this invention relates to a process as recited previously, wherein said EAO copolymer is a butane-LLDPE resin, in a density range of from about 0.818-0.922 g/cm³.

In another embodiment, this invention relates to a process for making a bulk-bag, as recited previously, wherein the size of said bulk-bag ranges from 20 gallons to 400 gallons. In yet another embodiment, this invention relates to a process for making a bulk-bag, as recited previously, wherein said at least one inner-ply is in the range of 20 µm to 140 µm thickness. In one embodiment, this invention relates to a process for making a bulk-bag, as recited previously, comprising flowable material. In another, this invention relates to a process, as recited previously, wherein said bulk-bag is an ESL, hot-fill, or pasteurization bag.

This invention further relates to a process for making a bulk-bag, as recited previously, wherein the HDPE peak-melting endotherm as percentage of the total melting endotherm, in a DSC measurement, of the resin blend is in the range of from about 40 to about 60. This invention also relates to a process for making a bulk-bag, as recited previously, wherein the HDPE peak-melting endotherm as percentage of the total melting endotherm, in a DSC measurement, of the resin blend is in the range of from about 50 to about 60.

DETAILED DESCRIPTION OF ILLUSTRATIVE EMBODIMENTS

Figure 1:
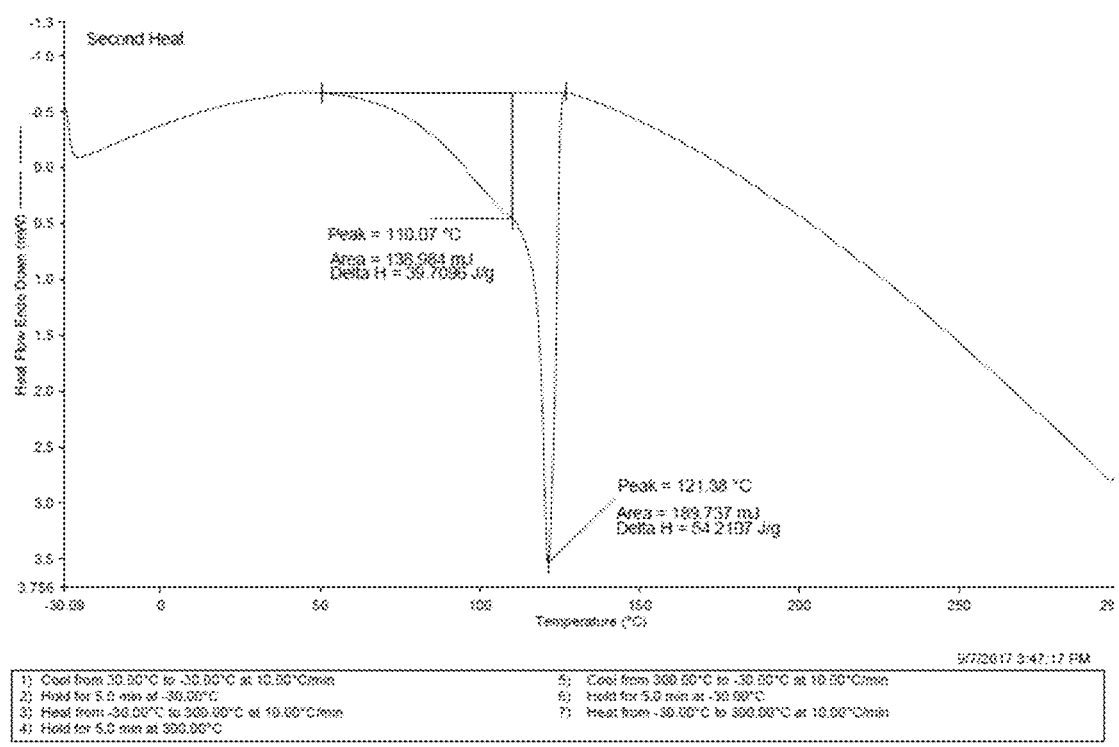
FIG. 1 shows a DSC melting curve (second-heat reheating; 10° C./min) for a butene-LLDPE (Equistar GA501-23), with a density of 0.918 g/cm$^3$ and MI of 1, which shows HDPE endotherm as 58% of the total melting endotherm.
Figure 2:
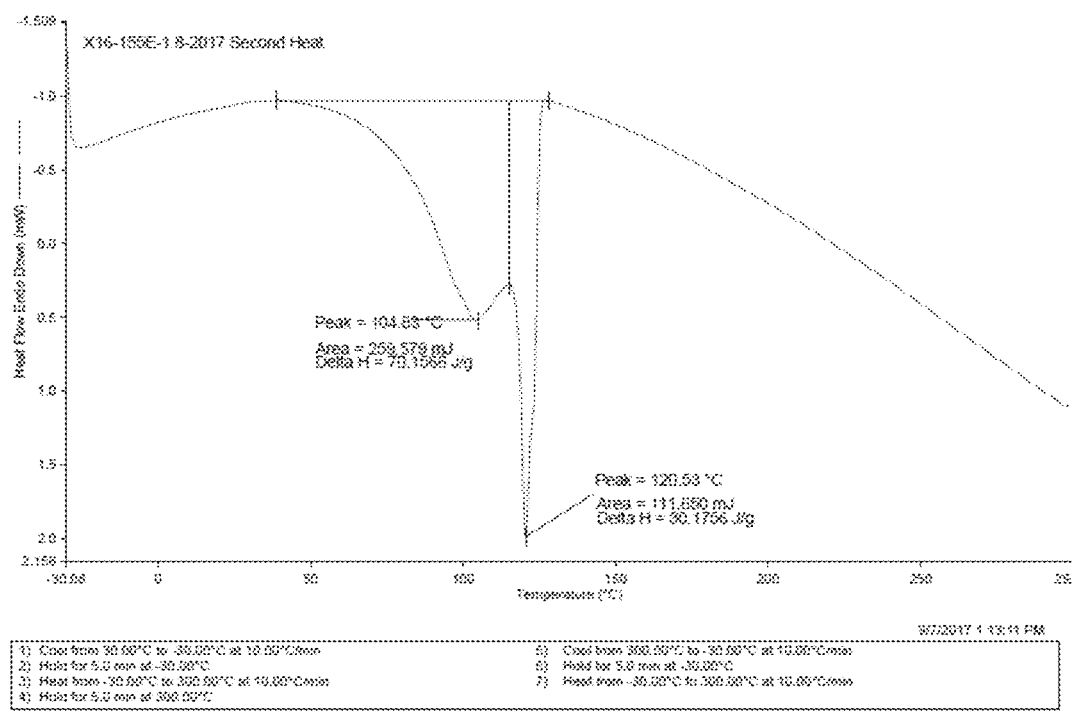
FIG. 2 shows a DSC melting curve (second-heat reheating; 10° C./min) for an octene-LLDPE (Dow Elite® 5400G)+10% LDPE (Dow 611A), with a density of 0.916 g/cm$^3$ and MI of 1, which shows HDPE endotherm as 30% of the total melting endotherm.
Figure 3:
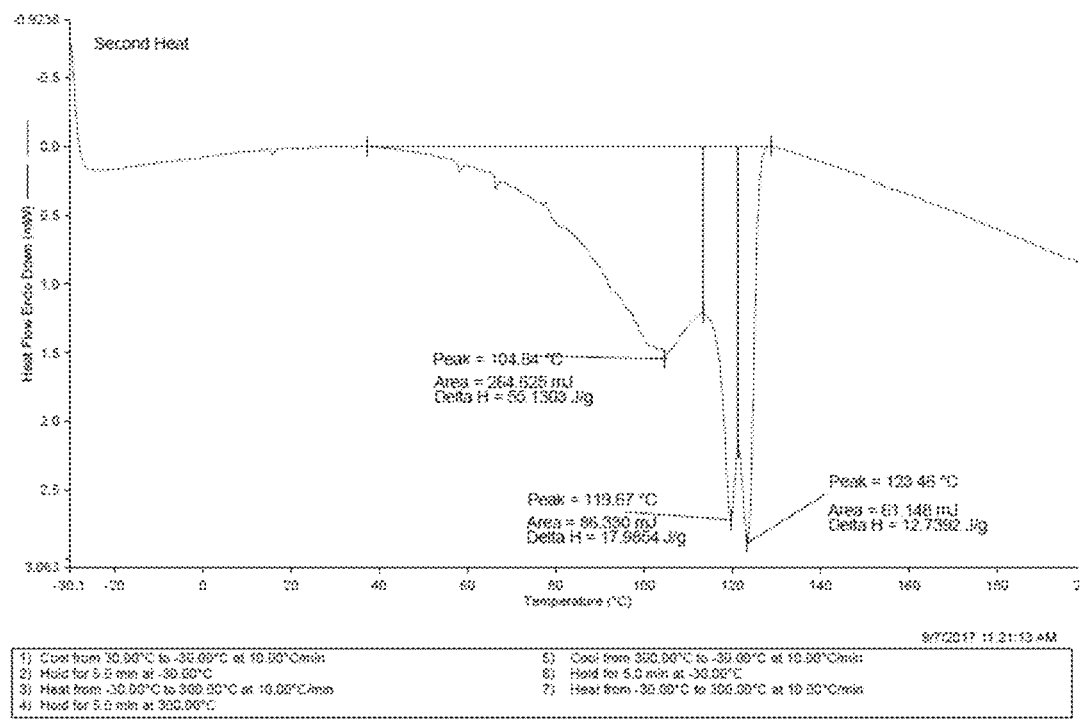
FIG. 3 shows a DSC melting curve (second-heat reheating; 10° C./min) for an ULDPE resin, with a density of 0.912 g/cm$^3$, and MI of 1, which shows HDPE endotherm as 36% of the total melting endotherm.
Figure 4:
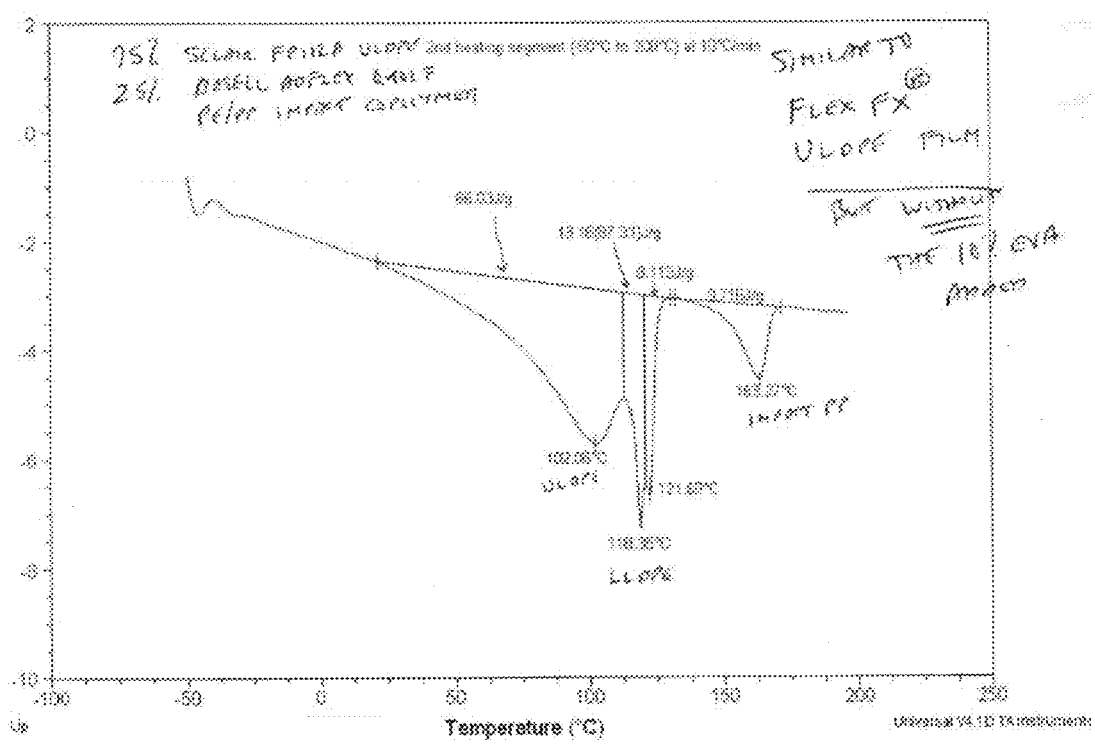
FIG. 4 shows a DSC melting curve (second-heat reheating; 10° C./min) for a polymeric blend comprising: 25% PP+61% ULDPE+10% EVA (FlexFX®), with a density of 0.912 g/cm$^3$ and MI of 1 of the ULDPE portion, which shows HDPE endotherm as 24% of the total melting endotherm.
Figure 5:
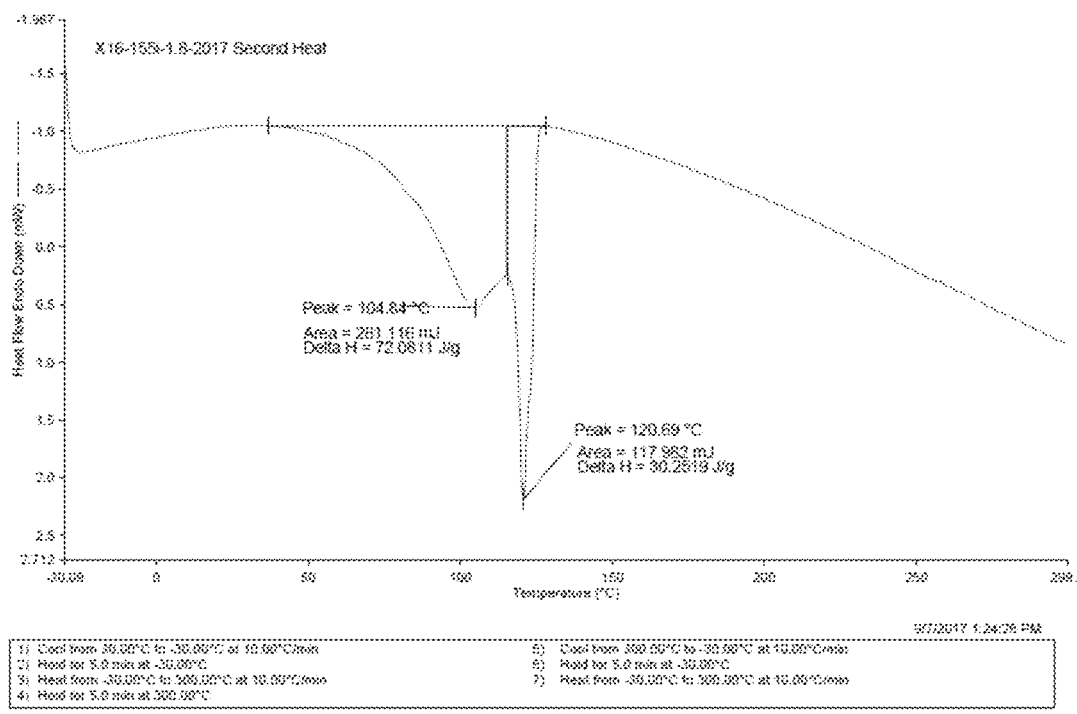
FIG. 5 shows a DSC melting curve (second-heat reheating; 10° C./min) for a polymeric blend comprising Dow Innate®+10% LDPE, with a density of 0.915 g/cm$^3$ and MI of 0.9, which shows HDPE endotherm as 30% of the total melting endotherm.

Ranges are used herein in shorthand, to avoid having to list and describe each value within the range. For example, any appropriate value within the range can be selected as the upper value, lower value, or the terminus of the range.

As used herein, the singular form of a word includes the plural, and vice versa, unless the context clearly dictates otherwise. Thus, the references "a," "an," and "the" are generally inclusive of the plurals of the respective terms. For example, reference to "a method" includes a plurality of such "methods." Likewise, the terms "include," "including," and "or" should all be construed to be inclusive, unless such a construction is clearly prohibited from the context. Similarly, the term "examples," particularly when followed by a listing of terms, is merely exemplary or illustrative and should not be deemed exclusive or comprehensive.

The term "comprising" is intended to include embodiments encompassed by the terms "consisting essentially of" and "consisting of." Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

This invention relates to flowable products.

As used herein, the term "flowable product" encompasses materials that are flowable under gravity or may be pumped. Flowable product includes a fluid, a liquid, a semi-liquid, a paste, and a combination thereof, with or without particulates in them. Normally such materials are not gaseous. Food products or ingredients in liquid, powder, paste, oils, granular or the like forms, of varying viscosity are envisaged. Materials used in manufacturing and medicine are also considered to fall within such materials.

Flowable product includes food and non-food products. Such materials include liquids, for example, milk, water, juice, fruit juice, oil; emulsions, for example, ice cream mix, soft margarine, shampoo, liquid soap and detergent; pastes, for example, meat pastes, cheese, sauce, and peanut butter; preserves, for example, jams, pie fillings, and marmalade; jellies; doughs; ground meat, for example, sausage meat; powders, for example, gelatin powders, detergents; granular solids, for example, nuts, sugar, and salt; puree; concentrates; mixes; and such materials. The invention described herein is particularly useful for flowable foods.

By non-flowable products is meant, generally larger solids, for example solids that are not considered particles or particulate matter. While this invention applies both to flowable products and non-flowable products, and to food products and non-food products, the invention is discussed in terms of flowable products. The discussion applies to non-flowable products as well.

This invention relates to flex-crack resistant, and thermally resistant bulk-bags for aseptic packaging of flowable materials, wherein said bag comprises at least one inner-ply, wherein said at least one inner ply comprises a film made from a resin blend comprising:

(a) at least 60% of Exceed® XP resin; and
(b) one of the following three components:
   (i) from 0-40% of LDPE;
   (ii) from 0-40% of EAO copolymer; and
   (iii) from 0-40% of a blend of LDPE and said EAO copolymer;

wherein said resin blend's overall density is at least 0.915; and wherein said bulk-bag has flex-crack resistance such that said film develops less than 5 pinholes per 300 cm² in 8,100 cycles in both, machine direction and transverse direction, in a Gelbo Flex Test as measured according to ASTM F392.

Inner-Ply in Bulk-Bag

The inner ply comprises a film made from a resin blend comprising:
 (a) at least 60% of Exceed® XP resin; and
 (b) one of the following three components:
  (i) from 0-40% of LDPE;
  (ii) from 0-40% of EAO copolymer; and
  (iii) from 0-40% of a blend of LDPE and said EAO copolymer;
 wherein said resin blend's overall density is at least 0.915; and
 wherein the thickness of said inner-ply range from 25 μm to 100 μm.

The film of this invention can be used as a monolayer, which forms the inner-ply. The film of the invention can also be used as a skin layer in a three-layer, five-layer, or seven-layer structure, wherein at least one outer layer, or the skin layer, is the film of the present invention described herein. The other layers of the multilayer film used as inner-ply are standard structures found in various references discussed herein.

The film of the invention can form the skin layer in multilayer films for making bags. Multi-ply bags or pouches can be made, which incorporate at least one film as inner-ply that is a monofilm or multilayer film of the invention. The monofilm produced may have a film thickness of from about 20 to about 150 microns. Preferably, the monofilm thickness may range from about 25 to about 140 microns and more preferably from about 30 to about 125 microns.

Stated another way, the thickness of the inner-ply can be any one of the following numbers measured in μm, or in a range defined by any two numbers provided below, including the endpoints of such range:

20; 21; 22; 23; 24; 25; 26; 27; 28; 29; 30; 31; 32; 33; 34; 35; 36; 37; 38; 39; 40; 41; 42; 43; 44; 45; 46; 47; 48; 49; 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; 100; 101; 102; 103; 104; 105; 106; 107; 108; 109; 110; 111; 112; 113; 114; 115; 116; 117; 118; 119; 120; 121; 122; 123; 124; 125; 126; 127; 128; 129; 130; 131; 132; 133; 134; 135; 136; 137; 138; 139; and 140.

The resin components of the blend used for preparing said at least one inner-ply of the bulk-bag are described below.

The inner-ply in bulk-bag is configured to provide thermal resistance. The thermal resistance can be measured as an HDPE (high-density polyethylene) peak-melting endotherm (PME) as percentage of the total melting endotherm (TME), in a DSC measurement. In one embodiment of the invention, the HDPE endotherm percentage is at least 40%. It can be as high as 60%. Stated another way, the HDPE peak-melting endotherm as percentage of the total melting endotherm (100×[PME/TME]), in a DSC measurement for the resin blend used to make the inner-ply of the bulk-bag of the present invention can be any one of the following numbers measured in %, or in a range defined by any two numbers provided below, including the endpoints of such range:

40; 41; 42; 43; 44; 45; 46; 47; 48; 49; 50; 51; 52; 53; 54; 55; 56; 57; 58; 59; and 60.

A. Exceed® XP Resin

Figure 6:
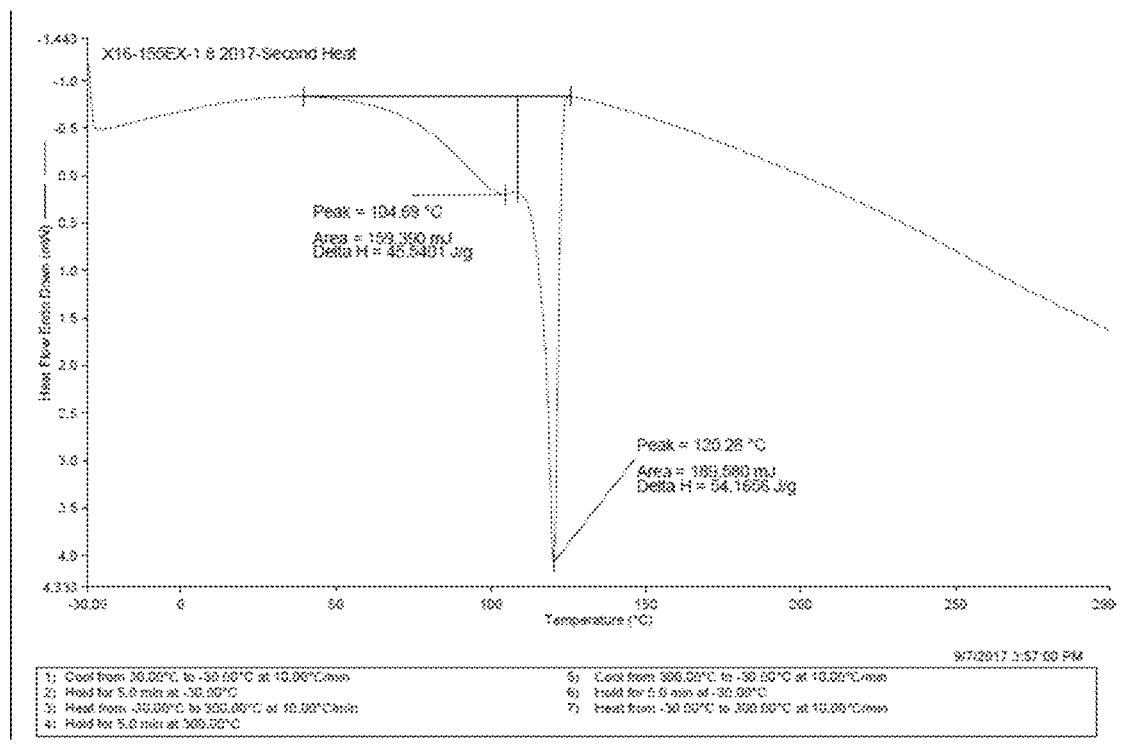
FIG. 6 shows a DSC melting curve (second-heat reheating; 10° C./min) for a polymeric blend comprising: Exxon Exceed® XP+10% LDPE (Dow 611A), with a density of 0.916 g/cm$^3$, which shows HDPE endotherm as 54% of the total melting endotherm.

Exceed® XP is a resin of ethylene-hexene-1 copolymer and a second ethylene-α-olefin copolymer, with MI in the range of 0.2 to 0.80.85 dg/min, and a density in the range of 0.914 to 0.918 g/cm³. It shows a bimodal molecular weight distribution, as demonstrated by two peaks in the DSC endotherm of FIG. 6. It is prepared using the advanced molecular catalysts, and the high molecular weight fraction provides the thermal resistance, and the low molecular weight fraction provides flex-crack resistance to bulk-bags for aseptic packaging. Some of the Exceed® XP grades include XP 6026 Series (0.2, 0.916); XP 6056ML (0.5, 0.916); XP8318ML (1.0, 0.918); XP 8358 Series (0.50, 0.918); XP 8656MK (0.50, 0.916); XP 8656ML (0.50, 0.916); and XP 8784 Series (0.80, 0.914). This invention also includes blends prepared from one or more of the XP resin grades to arrive at the right melt-index and density. The numbers in the parenthesis are melt-index and density, measured in dg/min and g/cm³, respectively. The Exceed® XP resin is obtained from the ExxonMobil Company.

The melt-index of the Exceed® XP resin grade or the blend of the said resin grade can be in the range of from about 0.2 to about 0.8 dg/min. Stated another way, the melt-index can be any one number from the list of following numbers:

0.2, 0.3, 0.4, 0.5, 0.6, 0.7, and 0.8.

The melt-index can also be in a range defined by any two numbers above, including the end-points of the range.

The density of the Exceed® XP resin grade or the blend of the said resin grade can be in the range of from about 0.914 to about 0.918 g/cm³. Stated another way, the density can any one number from the list of following numbers:

0.914, 0.915, 0.916, 0.917, and 0.918.

The density can also be in a range defined by any two numbers above, including the end-points of the range.

An Exceed® XP resin grade or its blend can have a melt-index from the numbers provided above, and a density from the numbers provided above, which can also vary independently.

The content of the Exceed® XP resin in the blend used for preparing the inner-ply used in the bulk-bag of the present invention ranges from at least 68% to about 99%. Stated another way, the Exceed® XP content in the film used to make the inner-ply can be any one of the following numbers measured in %, or in a range defined by any two numbers provided below, including the endpoints of such range:

68; 69; 70; 71; 72; 73; 74; 75; 76; 77; 78; 79; 80; 81; 82; 83; 84; 85; 86; 87; 88; 89; 90; 91; 92; 93; 94; 95; 96; 97; 98; and 99.

B. LDPE

By LDPE is meant the low-density polyethylene. Generally, "low-density" refers to the 0.918-0.930 g/cm³ range of polyethylene densities. The LDPE molecules have complex branching patterns, with no easily distinguishable backbone. The polymer molecules are composed of a whole network of branches of various lengths from short to long. The LDPE can be the high-pressure, low-density polyethylene, or HP-LDPE, which is relatively high in average molecular weight, in other words, low in melt-index (0.1-1.1 dg/min).

The LDPE can be added at up to 30% by weight of the polymer blend of the inner-ply. Stated differently, the weight percent of LDPE in the polymer blend of the inner-ply film can be any one of the following numbers measured in %, or in a range defined by any two numbers provided below, including the endpoints of such range:

0; 1; 2; 3; 4; 5; 6; 7; 8; 9; 10; 11; 12; 13; 14; 15; 16; 17; 18; 19; 20; 21; 22; 23; 24; 25; 26; 27; 28; 29; and 30%.

A preferred range of LDPE weight content is from 10-15% of the polymer blend in the inner-ply. A preferred LDPE is one with an MI between 0.25-1 dg/min and a density of 0.918-0.925 g/cm$^3$. For example, Dow 611A, with a density of 0.924 g/cm$^3$ and an MI of 0.88 is preferred. Also preferred is Dow 132i with an MI of 0.25 and a density of 0.921 g/cm$^3$.

C. Ethylene-α-Olefin Copolymer (EAO Copolymer)

The EAO copolymer used herein is ethylene-C$_4$ to C$_{10}$-α-olefin interpolymer. The ethylene-C$_4$ to C$_{10}$-α-olefin interpolymer or EAO copolymer has a melt index of from 0.4 to 1.5 dg/min (g/10 min; 190° C., 2.16 kg); a density of from 0.900 to 0.916 g/cm$^3$ may be a single polymer, or a blend of two polymers, or even several individual polymer grades. Interpolymer encompasses copolymers, terpolymers, and the like. This EAO copolymer may be selected from linear, low-density polyethylenes (LLDPEs). Using industry convention, linear, low-density polyethylenes in the density range 0.915-0.930 g/cm$^3$ will be referred to as LLDPEs and in the density range of 0.900-0.915 g/cm$^3$ will be referred to as ultra-low-density polyethylenes (ULDPEs) or very low-density polyethylenes (VLDPEs).

Heterogeneously branched ULDPE and LLDPE are well-known among practitioners of the linear polyethylene art. They are prepared using Ziegler-Natta solution, slurry or gas phase polymerization processes and coordination metal catalysts as described, for example, by Anderson, et al. in U.S. Pat. No. 4,076,698, the disclosure of which is incorporated herein by reference. These Ziegler-type linear polyethylenes are not homogeneously branched and they do not have any long-chain branching. At a density less than 0.90 g/cm$^3$, these materials are very difficult to prepare using conventional Ziegler-Natta catalysis and are also very difficult to pelletize. The pellets are tacky and tend to clump together. Companies such as Dow, Nova, and Huntsman can produce suitable interpolymers commercially (tradenames Dowlex™, Sclair™ and Rexell™, respectively) using a solution phase process; ExxonMobil, ChevronPhillips and Nova can produce suitable interpolymers (tradenames NTX™, MarFlex™ LLDPE, Novapol™ LLDPE respectively) by a gas phase process; ChevronPhillips uses a slurry process (MarFlex™ LLDPE). These polymers can be used as a blend component of the inner-ply film layer.

Homogeneously branched ULDPEs and LLDPEs are also well known among practitioners of the linear polyethylene art. See, for example, U.S. Pat. No. 3,645,992 to Elston. They can be prepared in solution, slurry or gas phase processes using single site catalyst systems. For example, Ewen, et al., in U.S. Pat. No. 4,937,299, describe a method of preparation using a metallocene version of a single site catalyst. The disclosures of Elston and Ewen are incorporated herein by reference. These polymers are sold commercially by ExxonMobil Chemical under the trademark Exact® and by Dow Chemical under the trademark Affinity® and by Nova Chemical under the trademark Surpass®.

The term "homogeneously-branched" is defined herein to mean that (1) the α-olefin monomer is randomly distributed within a given molecule, (2) substantially all of the interpolymer molecules have the same ethylene-to α-olefin monomer ratio, and (3) the interpolymer has a narrow short chain branching distribution. The short chain branching distribution index (SCBDI) is defined as the weight percent of the polymer molecules having a comonomer content within 50 percent of the median total molar comonomer content. The short chain branching distribution index of polyolefins that are crystallizable from solutions can be determined by well-known temperature rising elution fractionation techniques, such as those described by Wild, et al., Journal of Polymer Science, Poly. Phys. Ed., Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or U.S. Pat. No. 4,798,081.

Suitable C$_4$ to C$_{10}$-α-olefin for inclusion in the linear low-density polyethylenes of the present invention may be 1-octene, 1-hexene, 1-butene, or mixtures thereof, most preferably the α-olefin is 1-octene.

A preferred EAO copolymer is up to 40% butene-LLDPE polymer in the density range of from about 0.818 to about 0.922 g/cm$^3$.

There is extensive description in the art of the types of polymers, interpolymers, copolymers, terpolymers, etc. that may be used in the inner-ply film of the bulk-bag of the present invention. Examples of patents that describe such polymers include U.S. Pat. Nos. 4,503,102; 4,521,437; and 5,288,531. These patents describe films used to make pouches, which films may also be used to make bags. Other patents references that describe skin layer polymers include U.S. Pat. Nos. 8,211,533; 8,252,397; 8,563,102; 9,757,926; 9,283,736; and 8,978,346.

Alternatives to any of these commercially available products would be selectable by a person skilled in the art for the present purposes. The resin blend defined above is selected to ensure that the resulting film has the characteristics defined. Other components, as subsequently described may be added to the blend as long as they do not negatively impact on the desired characteristics of the film of the invention.

Other Ingredients

The present blends may include additional ingredients as processing aids, anti-oxidation agents, UV light stabilizers, pigments, fillers, compatibilizers or coupling agents and other additives that do not affect the essential features of the invention. They may be selected from processing masterbatches, colorant masterbatches, at least one low-density ethylene homopolymer, copolymer or interpolymer which is different from component the EAO copolymer of the component (b) of the present blend, at least one polymer selected from the group comprising EVA, EMA, EM, at least one polypropylene homopolymer or polypropylene interpolymer also different from component (b) of the present blend. The processing additives generally referred to, as "masterbatches" comprise special formulations that can be obtained commercially for various processing purposes.

In the present instance, the processing additives are selected from combinations of slip agents, anti-block agents, colorants and processing aids. In the present formulation, the amount of processing additives may range from 0 wt. % to about 20 wt. %. Typical masterbatches may comprise 1-5 wt. % erucamide slip agent, 10-50 wt. % silica anti-block, 1-5 wt. % fluoropolymer process aid, and combinations of two, and of three, of these additives.

Bulk-Bags

Other aspects of the invention include bags for containing flowable materials made from the above films. The films of this invention are used as an inner-ply layer in multilayer films for making bags. Bags can be single-ply, or multi-ply. Multi-ply bags can be made which incorporate at least one film as inner-ply that is a monofilm or multilayer film of the invention. The inner plies of multi-ply bags, which are added to improve shipping and handling performance, are normally monofilms. Multi-layer films are used to make bags, which need a more sophisticated combination of properties, for example, higher barrier to oxygen. The outer ply of a multi-ply bag is often a multilayer film. The middle or inner ply may also be a multi-layer film, and is often of different composition than the outer ply.

The bags may be irradiated prior to use in accordance with standard procedures well known in the packaging art. Aseptic packaging is the main feature of bags of the present invention. Also envisaged are improved bag making processes using such films.

In multi-layer polymeric film, the layers generally adhere to each other over the entire contact surface, either because the polymer layers inherently stick to each other or because an intermediate layer of a suitable adhesive is used. The plies in a multi-ply bag or pouch do not adhere to each other except at the edges of the bag or pouch in the heat seals, or in the fitment area.

This invention further relates to a bulk-bag, as recited previously, wherein the HDPE peak-melting endotherm as percentage of the total melting endotherm, in a DSC measurement, of the resin blend is in the range of from about 40 to about 60. This invention also relates to a process for making a bulk-bag, as recited previously, wherein the HDPE peak-melting endotherm as percentage of the total melting endotherm, in a DSC measurement, of the resin blend is in the range of from about 50 to about 60.

The bags which may be produced from the films of the invention are pre-made and then usually filled with food through a fitment. They are often sterilized and may be, for example, irradiated in a batch process, employing standard radiation conditions known in the art. The film may also be sterilized rather than the bags. Sterilization can be achieved in a variety of known ways such as by exposure of the film or bag to hydrogen peroxide solution. The films used to make pouches may be similarly treated prior to package formation. Of importance is that the films and bags can endure aseptic packaging condition.

The bags or pouches using the resin blend compositions of the present invention can also be surface treated and then printed by using techniques known in the art, e.g., use of corona treatment before printing.

The capacity of the bags made from the composition of the present invention may vary considerably. Typically, bags can be sized from 2 to 400 gallons. For example, the bags may range in size given by any number given below in gallons, or within the range defined by any two numbers given below, including the end-points:
2, 3, 4, 5, 6, 7, 8, 9, 10, 20, 30, 40, 50, 60, 70, 80, 90, 100, 150, 250, 300, 350, 400.

The bags are pre-made and then usually filled through a fitment. They are often radiation sterilized in a batch process by the bag manufacturer. The packaging conditions may include those for aseptic packaging.

Bag Making

Generally, the invention provides an improved bag-making process comprising the steps of providing a multi-ply film structure, having inner and outer plies, wherein at least one of the plies is a film of the invention, securing a spout to inner and outer plies of the film structure through a hole provided therein, sealing the plies together transversely across the width of the multi-ply film structure, to form a top seal of one bag and a bottom seal of the bag and a top seal of an adjacent bag, then sealing the plies together parallel to the length of the bag line are applied at either side of the films, and trapped air being removed prior to completely sealing the bag, and separating the bags immediately or just prior to use.

Bag-making process is described generally in U.S. Pat. No. 8,211,533, which is incorporated by reference herein.

In one aspect, the present invention relates to providing a film described herein for making a bulk-bag, wherein said film forms the inner-ply of the multi-ply bag.

This invention further relates to a process for making a bulk-bag, as recited previously, wherein the HDPE peak-melting endotherm as percentage of the total melting endotherm, in a DSC measurement, of the resin blend is in the range of from about 40 to about 60. This invention also relates to a process for making a bulk-bag, as recited previously, wherein the HDPE peak-melting endotherm as percentage of the total melting endotherm, in a DSC measurement, of the resin blend is in the range of from about 50 to about 60.

Bags Filled with Flowable Materials

In one aspect, this invention also relates to bags described above, filled with flowable materials. Examples include bags filled with flowable materials such as water, beverages, juices, coffee, tea, energy drinks, beer, wine, sauces, mustard, ketchup, food dressings, milk, cheese, sour-cream, mayonnaise, salad dressings, relish, oils, soft margarine, coffee concentrate, pastes, puree, ice cream mix, milk shake mix, preserves, emulsions, doughnut fillings, jellies, detergents, caulking materials, medicines, materials used in manufacturing, and the like.

EXPERIMENTAL

Tests used to characterize and select the resin blends for the films of the present invention are described below.

A. Flex-Crack Resistance

The Gelbo Flex test was used to determine the flex-crack resistance of film used for inner-ply of bulk-bags. The test is described below.

Gelbo Flex Test

This test determines the resistance of flexible packaging materials and films to pinhole failures resulting from flexing. However, it does not measure any abrasion characteristic relating to flex failure. The colored-turpentine portion of the test measures the failures characterized by physical holes completely through the structure.

The Gelbo Flex tester is set up to test in accordance with ASTM F392. This apparatus consists essentially of a 3.5-inch (90 mm)-diameter stationary mandrel and a 3.5-inch movable mandrel spaced at a distance of 7 inches (180 mm) apart from face-to-face at the start position (that is, maximum distance) of the stroke. The sides of the film sample are taped around the circular mandrels so that it forms a hollow cylinder between them. The motion of the moving mandrel is controlled by a grooved shaft, to which the moving mandrel is attached. The shaft is designed to give a twisting motion of 440 degrees, and at the same time, move itself toward the fixed mandrel to crush the film so that the facing mandrels end up 1-inch apart, at their minimum distance. The motion of the machine is reciprocal with a full cycle consisting of the forward and return stroke. The machine operates at 45 cycles per minute.

In this tester, specimens of flexible materials are flexed at standard atmospheric conditions (23° C. and 50% relative humidity), unless otherwise specified. The number of flexing cycles can be varied depending on the flex-crack resistance of the film structure being tested. A pinhole-resistant film will develop very few pinholes (less than 5), even when subjected to a large number of flex cycles (at least 10,000).

The flexing action produced by this machine consists of a twisting motion, thus repeatedly twisting and crushing the film. Flex-crack failure is determined by measuring pinholes formed in the film. The pinholes were determined by painting one side of the tested film sample (300 cm$^2$ in area) with colored turpentine and allowing it to stain through the holes onto a white backing paper or blotter. Pinhole formation is the standard criterion presented for measuring failure, but other tests such as gas-transmission rates can be used in place of, or in addition to, the pinhole test. The results reported are the average of four repeats.

Example 1: Gelbo Flex Test at 8,100 Cycles

The Gelbo Flex test was performed according to the ASTM F-392 method. Monolayer films were blown at 1.8 mil (1 mil=1/1000 inch) thickness. The films were subjected to 8,100 cycles in one minute before the pinholes were counted on the paper.

As shown below in Examples 1 and 1T, the standard octene-LLDPE/LDPE polymer having a high density of 0.916, showed a poor flex-crack resistance when subjected to the Gelbo Flex Test, evident by the number of pinholes detected, that is, 25, in both, the machine direction as well as the transverse direction.

When a lower-density polymer such as the standard Dow Attane® 6401 was used, the pinholes count was found between 1-5, in both, the machine direction as well as the transverse direction of the Gelbo Flex Test. Note, the density of the Dow Attane® 6401 polymer resin is 0.912, which is much lower than the standard octene-LLDPE/LDPE resin density of 0.916.

It should be noted that lowering the density of the component resin will likely improve flex-crack resistance of a film—and this is well-known. Also well-known is the fact that at higher densities, the thermal resistance of the film is much better than that at lower densities.

The results below show that the Exxon Exceed® XP 8656 film has superior flex-crack resistance in both the machine direction (MD) and transverse direction (TD) versus the standard octene-LLDPE film of same density (5400 G) and the Dow Innate® resin (59910.04). The Exxon XP film in fact performs similar to an ULDPE film of 0.912 density. This is surprising and unexpected.

TABLE 1

Gelbo Flex Testing-Pinhole Count Results-Comparative versus Inventive Film

| Material Sample | Film Composition | Density g/cm$^3$ | Melt Index (units?) | Direction | Cycles/min | Pinholes Count—Paper |
|---|---|---|---|---|---|---|
| 1 | Dow 5400 octene-LLDPE + 10% Dow 611A LDPE | 0.916 | 1 | MD | 8,100 | 25 |
| 1T | Dow 5400 octene-LLDPE + 10% Dow 611A LDPE | 0.916 | 1 | TD | 8,100 | 23 |
| 2 | Dow Attane ® 6401 | 0.912 | | MD | 8,100 | 1-5 |
| 2T | Dow Attane ® 6401 | 0.912 | | TD | 8,100 | 1-5 |
| 3 | Dow Innate ® XUS 59910.04 + 10% Dow 611A LDPE | 0.915 | 0.9 | MD | 8,100 | 2 |
| 3T | Dow Innate ® XUS 59910.04 + 10% Dow 611A LDPE | 0.915 | 0.9 | TD | 8,100 | 23 |
| 4 | Exxon Exceed ® XP8656 + 10% Dow 611A LDPE | 0.916 | 0.5 | MD | 8,100 | 3 |
| 4T | Exxon Exceed ® XP8656 + 10% Dow 611A LDPE | 0.916 | 0.5 | TD | 8,100 | 3 |

Example 2: Gelbo Flex Test at 27,000 Cycles

In this flex test (not according to the ASTM standard), the film sample used was a 280 mm×200 mm template, which would equate to 0.056 m$^2$. Three film samples were prepared, one comparative standard sample, and two experimental or inventive samples. All three samples were cut using the same template and under the same conditions. The material was tested in the form in which it was received from the production floor.

The three samples were attached to the mandrels using 10-12 mm wide, double-sided tape. The test parameters were then entered on the unit and the test was conducted. It was stopped once the flex testing cycles were completed. Each cycle turned the film/bag up to 440°, with a horizontal stroke of 155 mm. The twist frequency on the machine equaled 45 cycles/min.

Figure 7:
FIG. 7 shows a Gelbo Flex Testing Machine.
Figure 8:
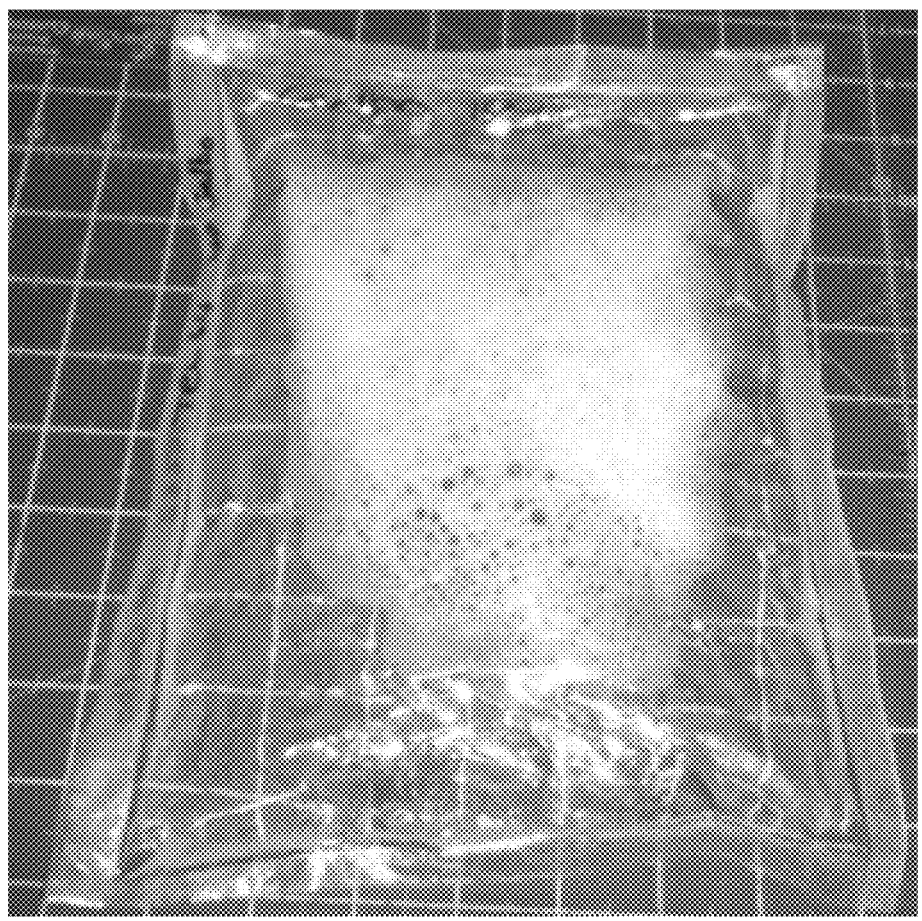
FIG. 8 shows pinholes in a small pouch filled with soap water.

FIG. 7 shows the GFT machine. After 27,000 cycles in the GFT machine, samples were tested for the number of pinholes created during the Flex-Durability Test. The three test samples were sealed into a small pouch and was filled with soapy water. The bag was then compressed and the number of water leaks or pinholes was counted. FIG. 8 shows the soapy water filled bag for counting of the pinholes.

TABLE 2

Film Samples for Example 2

| Sample Film | Resin Content | Comments | No. of Pinholes |
|---|---|---|---|
| Standard Liner Film; 50 μm | Exxon KI 45% + Exxon XV 45% + Sasol LT 660 10% | Exxon KI is the Exxon LL1001 butene-LLDPE resin with slip and antiblock. Exxon XV is Exxon LL1001 butene-LLDPE, but without slip or the antiblock. | >30 |

TABLE 2-continued

Film Samples for Example 2

| Sample Film | Resin Content | Comments | No. of Pinholes |
|---|---|---|---|
| Experimental Samples—New Liner Film; 50 μm | Exceed ® XP 69% + Exxon KI 30% + 1% Anti Block | For the Exceed ® XP, an equivalent grade, Exceed ® EXT656A Barefoot, from Exxon, was used at 69% by weight of the blended resin for preparing the experimental samples. For the Exxon KI resin, that is, the butene-LLDPE resin, the Exxon LL1001BT Medium Slip grade, was used at 30% by weight of the blended resin for preparing the experimental samples. | <8 |
| Experimental Samples—New Liner Film; 40 μm | Exceed ® XP 69% + Exxon KI 30% + 1% Anti Block | For the Exceed ® XP, an equivalent grade, Exceed ® EXT656A Barefoot, from Exxon, was used at 69% by weight of the blended resin for preparing the experimental samples. For the Exxon KI resin, that is, the butene-LLDPE resin, the Exxon LL1001BT Medium Slip grade, was used at 30% by weight of the blended resin for preparing the experimental samples. | <3 |

From the above results, it can be seen that, surprisingly, the films made with Exceed® XP8656, even with a 30% butene-LLDPE blend, gives a 400% improvement in the flex-crack resistance over a standard liner film.

B. Thermal Resistance

Example 3: Improvement in Thermal Resistance Over ULDPE Resins

LLDPE resins contain a higher-melting "HDPE" peak, and a lower-melting peak due to the molecular weight distribution in the polymer. The greater the percentage of the HDPE peak to the overall melting endotherm, the greater thermal resistance the polymer will have. A series of DSC curves is presented below. The curves measure the percent HDPE portion in the overall melting endotherm. It can be summarized as follows. Based on DSC run at 10° C./min heating and cooling cycle. All values were based on second-head DSC.

TABLE 3

Thermal Resistance as Result of HDPE Peak Endotherm Percentage of Overall Enthalpy

| No. | A Film Resins (Manufacturer) | B Density $g/cm^3$ | C HDPE Peak-Melting Endotherm (PME) J/g | D Total Melting Endotherm (TME) J/g | E % PME/TME 100 × [Col C/Col D] |
|---|---|---|---|---|---|
| 1. | Butene-LLDPE (Equistar GA501-23) | 0.918 | 54.2 | 93.9 | 58 |
| 2. | Octene-LLDPE (Dow Elite ® 5400G) + 10% LDPE (Dow 611A) | 0.916 | 30.2 | 100.4 | 30 |
| 3. | ULDPE (Dow Attane ® 4201) | 0.912 | 30.7 | 85.8 | 36 |
| 4. | Flex FX ® (blend 25% PP + 61% ULDPE + 10% EVA) | 0.912 (ULDPE portion) | 21.3 | 87.33 | 24 |
| 5. | Dow Innate ® 59900.04 + 10% LDPE | 0.915 | 30.26 | 102.33 | 30 |
| 6. | Exxon Exceed ® XP + 10% LDPE (Dow 611A) | 0.916 | 54.16 | 99.7 | 54 |

From the above table, and the DSC graphs below, it was found that the Exxon Exceed® XP has a high HDPE percentage, similar to a 0.918 $g/cm^3$ density butene-LLDPE. The FlexFX® film was unique in that it comprised a majority of ULDPE but still has thermal resistance to steam exposure. We know that a 0.918 $g/cm^3$ density butene-LLDPE also has adequate steam resistance during bulk-bag aseptic filling, so the Exxon Exceed® XP—having similar % HDPE of the total melting endotherm—should have similar thermal resistance, and much better than the thermal resistance of the ULDPE of 0.912 $g/cm^3$ density and octene-LLDPE of 0.916 $g/cm^3$ density.

Thus, a film made from a resin blend comprising Exxon Exceed® XP material provided thermal resistance to the aseptic packaging bulk-bag that requires sterilization by superheated steam at 250° F., and at the same time providing the flex-crack resistance. The bulk-bags made as such would have both flex-crack resistance that would be as low as 1-10 pinholes, and preferably 1-5 pinholes, both in the machine direction as well as the transverse direction, and thermal resistance that would be equivalent to a butene-LLDPE of 0.918 g/cm³ density.

What is claimed:

1. A flex-crack resistant, and thermally resistant bulk-bag for aseptic packaging of flowable materials, wherein said bag comprises at least one inner-ply, wherein said at least one inner ply comprises a film made from a resin blend comprising:
   (a) at least 60% of a resin comprising an ethylene-hexene-1 copolymer and an ethylene-α-olefin copolymer blend having a density range from 0.914 to 0.918 g/cm³ and a melt index range of 0.20 to 1.0 dg/min; and
   (b) one of the following three components:
      (i) from 0-40% of LDPE;
      (ii) from 0-40% of EAO copolymer; and
      (iii) from 0-40% of a blend of LDPE and said EAO copolymer;
   wherein said resin blend comprises an overall density of at least 0.915 g/cm³; and
   wherein said bulk-bag has flex-crack resistance such that said film develops less than 10 pinholes per 300 cm² in 8,100 cycles in both machine direction and transverse direction in a Gelbo Flex Test as measured according to ASTM F392, wherein the HDPE peak-melting endotherm as percentage of the total melting endotherm, in a DSC measurement, of the resin blend is in the range of from about 40 to about 60.

2. A bulk-bag, as recited in claim 1, comprising two inner-plies, each inner-ply comprising a film made from a resin blend comprising:
   (a) at least 60% of a resin comprising an ethylene-hexene-1 copolymer and an ethylene-α-olefin copolymer blend having a density range from 0.914 to 0.918 g/cm³ and a melt index range of 0.20 to 1.0 dg/min; and
   (b) one of the following three components:
      (i) from 0-40% of LDPE;
      (ii) from 0-40% of EAO copolymer; and
      (iii) from 0-40% of a blend of LDPE and said EAO copolymer;
   wherein said resin blend comprises an overall density of at least 0.915 g/cm³; and
   wherein said bulk-bag has flex-crack resistance such that said film develops less than 10 pinholes per 300 cm² in 8,100 cycles in both machine direction and transverse direction in a Gelbo Flex Test as measured according to ASTM F392, wherein the HDPE peak-melting endotherm as percentage of the total melting endotherm, in a DSC measurement, of the resin blend is in the range of from about 40 to about 60.

3. A bulk-bag, as recited in claim 1, wherein the EAO copolymer content is up to 40%.

4. A bulk-bag as recited in claim 1, wherein the size of said bulk-bag ranges from 20 gallons to 400 gallons.

5. A bulk-bag, as recited in claim 1, wherein said at least one inner-ply is in the range of 20 μm to 140 μm thickness.

6. A bulk-bag, as recited in claim 1, comprising flowable material.

7. A bulk-bag, as recited in claim 1, wherein said bulk-bag is an ESL, hot-fill, or pasteurization bag.

8. A bulk-bag, as recited in claim 1, wherein the HDPE peak-melting endotherm as percentage of the total melting endotherm, in a DSC measurement, of the resin blend is in the range of from about 50 to about 60.

9. A bulk-bag, as recited in claim 1, wherein said film develops less than 5 pinholes per 300 cm² in 8,100 cycles in both machine direction and transverse direction in a Gelbo Flex Test as measured according to ASTM F392.

10. A bulk-bag, as recited in claim 9, wherein the LDPE content is in the range of from about 5% to about 20%.

11. A bulk-bag, as recited in claim 10, wherein the LDPE content is in the range of from about 10% to about 15%.

12. A bulk-bag, as recited in claim 10, wherein said EAO copolymer is a butene-LLDPE resin, in a density range of from about 0.818-0.922 g/cm³.

13. A process for making a bulk-bag, comprising:
   (I) providing at least one inner-ply, wherein said at least one inner ply comprises a film made from a resin blend comprising:
      (a) at least 60% of a resin comprising an ethylene-hexene-1 copolymer and an ethylene-α-olefin copolymer blend having a density range from 0.914 to 0.918 g/cm³ and a melt index range of 0.20 to 1.0 dg/min; and
      (b) one of the following three components:
         (i) from 0-40% of LDPE;
         (ii) from 0-40% of EAO copolymer; and
         (iii) from 0-40% of a blend of LDPE and said EAO copolymer;
      wherein said resin blend comprises an overall density of at least 0.915 g/cm³; and
      wherein said bulk-bag has flex-crack resistance such that said film develops less than 10 pinholes per 300 cm² in 8,100 cycles in both machine direction and transverse direction in a Gelbo Flex Test as measured according to ASTM F392, wherein the HDPE peak-melting endotherm as percentage of the total melting endotherm, in a DSC measurement, of the resin blend is in the range of from about 40 to about 60.

14. A process for making a bulk-bag, as recited in claim 13, comprising:
   (I) providing two inner-plies, each inner-ply comprising a film made from a resin blend comprising:
      (a) at least 60% of a resin comprising an ethylene-hexene-1 copolymer and an ethylene-α-olefin copolymer blend having a density range from 0.914 to 0.918 g/cm³ and a melt index range of 0.20 to 1.0 dg/min; and
      (b) one of the following three components:
         (i) from 0-40% of LDPE;
         (ii) from 0-40% of EAO copolymer; and
         (iii) from 0-40% of a blend of LDPE and said EAO copolymer;
      wherein said resin blend comprises an overall density of at least 0.915 g/cm³; and
      wherein said bulk-bag has flex-crack resistance such that said film develops less than 10 pinholes per 300 cm² in 8,100 cycles in both machine direction and transverse direction in a Gelbo Flex Test as measured according to ASTM F392, wherein the HDPE peak-melting endotherm as percentage of the total melting endotherm, in a DSC measurement, of the resin blend is in the range of from about 40 to about 60.

15. A process for making a bulk-bag, as recited in claim 13, wherein the EAO copolymer content is up to 40%.

16. A process for making a bulk-bag, as recited in claim 13, wherein the size of said bulk-bag ranges from 20 gallons to 400 gallons.

17. A process for making a bulk-bag, as recited in claim 13, wherein said at least one inner-ply is in the range of 20 μm to 140 μm thickness.

18. A process for making a bulk-bag, as recited in claim 13, comprising flowable material.

19. A process for making a bulk-bag, as recited in claim 13, wherein said bulk-bag is an ESL, hot-fill, or pasteurization bag.

20. A process for making a bulk-bag, as recited in claim 13, wherein the HDPE peak-melting endotherm as percentage of the total melting endotherm, in a DSC measurement, of the resin blend is in the range of from about 50 to about 60.

21. A process for making a bulk-bag, as recited in claim 13, wherein said film develops less than 5 pinholes per 300 $cm^2$ in 8,100 cycles in both machine direction and transverse direction in a Gelbo Flex Test as measured according to ASTM F392.

22. A process for making a bulk-bag, as recited in claim 21, wherein the LDPE content is in the range of from about 5% to about 20%.

23. A process for making a bulk-bag, as recited in claim 22, wherein the LDPE content is in the range of from about 10% to about 15%.

24. A process for making a bulk-bag, as recited in claim 22, wherein said EAO copolymer is a butene-LLDPE resin, in a density range of from about 0.818-0.922 $g/cm^3$.

* * * * *